Oct. 31, 1950 W. H. ESSELMAN 2,528,126
VARIABLE VOLTAGE MOTOR CONTROL SYSTEM
Filed Feb. 11, 1949 2 Sheets-Sheet 1

INVENTOR
Walter H. Esselman.
ATTORNEY

Oct. 31, 1950  W. H. ESSELMAN  2,528,126
VARIABLE VOLTAGE MOTOR CONTROL SYSTEM
Filed Feb. 11, 1949  2 Sheets-Sheet 2

WITNESSES:
H. F. Susser
W. L. Groome

INVENTOR
Walter H. Esselman.
BY C. L. Freedman
ATTORNEY

Patented Oct. 31, 1950

2,528,126

UNITED STATES PATENT OFFICE 2,528,126

VARIABLE VOLTAGE MOTOR CONTROL SYSTEM

Walter H. Esselman, Cranford, N. J., assignor to Westinghouse Electric Corporation, East Pittsburgh, Pa., a corporation of Pennsylvania Application February 11, 1949, Serial No. 75,888

22 Claims. (Cl. 318—143)

This invention relates to motor control systems, and it has particular relation to variable voltage motor control systems incorporating regulator generators.

Various motor control systems are disclosed and employed in the prior art. Many of them are of the variable voltage type and incorporate regulator generators for the purpose of improving the control exercised over the motors of the systems. A variable voltage motor control system is disclosed in the Santini et al. Patent 2,094,377, and the invention first will be discussed with reference to a motor control system of the type set forth in that patent.

In accordance with the invention, a regulator generator employed in a motor control system has field excitation supplied through a circuit having a time constant. For example, the regulator generator may have a field winding energized through a resistor which has a capacitor connected in shunt thereacross. The capacitor and resistor form components of a circuit having a time constant.

The circuit having a time constant improves the performance of the motor control system. In order to obtain the desired performance it may be preferable to employ the circuit during the entire operation of the motor employed in the motor control system. Alternatively it may be desirable to incorporate a time constant circuit when the motor is being brought to a stop or to vary the time constant of the circuit during the stopping operation.

The time-constant circuit may operate to introduce damping in an amount which is a function of the derivative of the motor speed. If the time constant is obtained by connecting a capacitor across a resistor through which a field winding of the regulator generator is energized during a stopping operation of the motor, the rate of retardation of the motor may be controlled in accordance with a desired pattern. The invention is particularly effective in controlling the slowdown of an elevator car and will be discussed in connection with an elevator system.

It is, therefore, an object of the invention to provide an improved motor control system wherein a regulator generator has field excitation supplied through a circuit having a substantial time constant.

It is a further object of the invention to provide a variable voltage motor control system wherein a regulator generator has a field winding energized through a resistor having a capacitor unit connected thereacross.

It is also an object of the invention to provide a variable voltage motor control system wherein a regulator generator has field excitation supplied through a circuit having an adjustable time constant.

It is another object of the invention to provide a variable voltage motor control system wherein a regulator generator has a field winding energized through a resistor and wherein a capacitor is connected across a resistor in response to initiation of a stopping operation of the motor employed in the system.

It is an additional object of the invention to provide an improved elevator system having a variable voltage motor control system for controlling the rate of rotation of an elevator motor wherein a regulator generator has a field winding energized through a resistor in accordance with the motor voltage, and wherein a capacitor is connected across the resistor for controlling the rate of change of the field excitation for the regulator generator.

Other objects of the invention will be apparent from the following description, taken in conjunction with the accompanying drawings, in which:

In Fig. 1 the circuits are illustrated in conventional straight line form wherein the contacts of relays and the relay coils may be substantially separated from each other;

Figure 1:
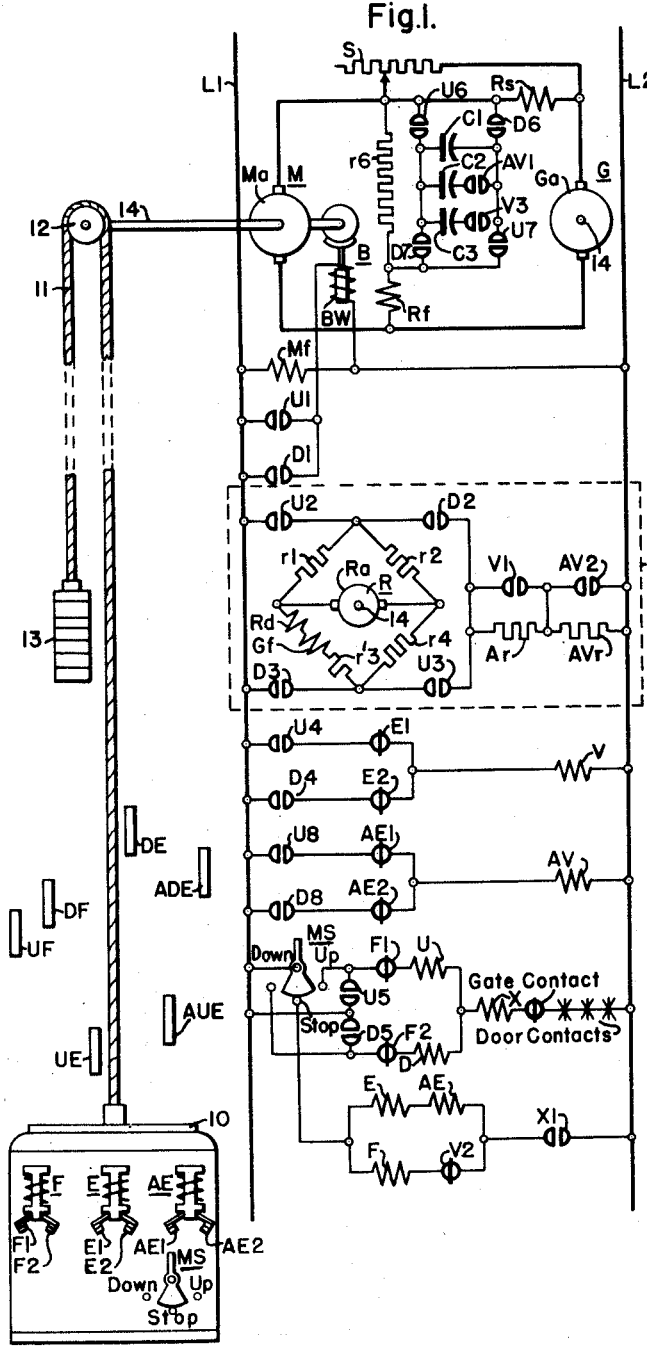
Figure 1 is a schematic view with parts in elevation and parts broken away, and parts in perspective of an elevator system embodying the invention.
Figure 1A:
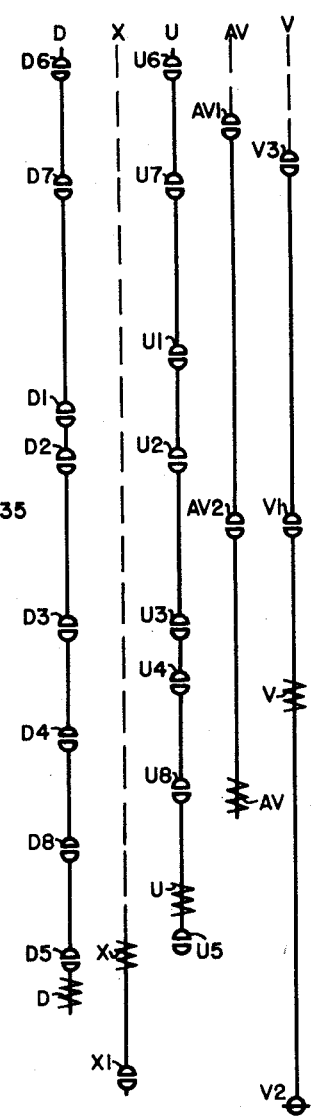
Fig. 1A is a key diagram showing the relationship of the coils and contacts of certain relays and switches employed in the system of Fig. 1. The vertical positions of each coil and each pair of contact members in Fig. 1A are substantially the same as the corresponding positions of the same components in Fig. 1.

Referring to Fig. 1, an elevator system is disclosed which incorporates a variable voltage motor control. In order to simplify the presentation of the invention, the system of Fig. 1 has been based on Fig. 5 of the aforesaid Santini et al. patent. The following components, illustrated in Fig. 1, also are disclosed in the Santini et al. patent and are identified by the same reference characters:

Elevator car 10
Cable 11
Sheave 12
Counterweights 13
Shaft 14
Inductor relay E (contact members E1, E2)
Landing inductor relay F (contact members F1, F2)
Inductor plates UE, DE
Master switch MS
Motor M (armature Ma, main field winding Mf)
Energized conductors L1, L2
Brake B
Brake releasing winding Bw
Generator G (armature Ga, main field winding Gf)
Regulator generator R (armature Ra, field winding Rf, field winding Rd, field winding Rs)
Up switch U (contact members U1 to U5)
Down switch D (contact members D1 to D5)
Auxiliary switch X (contact members X1)
Resistors r1, r2, r'3, r4, 46 Ar
Shunt S
Speed relay V (contact members V1, V2).

Since the foregoing components are fully disclosed in the Santini et al. patent and operate in exactly the same manner, a detailed discussion thereof is here unnecessary. (In the patent the winding Rf and Rd are referred to as shunt and differential field windings respectively. In current practice it is more common to refer to the winding Rf as a differential field winding and to refer to the winding Rd as a pattern field winding.) Certain additional components have been added to the system of Fig. 1, and these now will be discussed.

An auxiliary inductor relay AE is provided on the elevator car 10 for the purpose of providing an additional slowdown point for the elevator car. This inductor relay cooperates with an up inductor plate AUE and a down inductor plate ADE positioned in the elevator hoistway for each of the floors at which the elevator car is to make a stop when travelling in the up direction and in the down direction respectively. The inductor relay AE and its associated inductor plates are similar in construction to the inductor relay E and the associated inductor plates UE and DE.

If the elevator car is travelling in an up direction and is to stop at a floor, it will be observed that the inductor relay E first reaches the inductor plate UE of the desired floor to initiate a slow down of the elevator car. Subsequently the inductor relay AE reaches the inductor plate AUE of the floor to further decrease the speed of the elevator car. Finally the landing inductor relay F reaches the inductor plate UF for the purpose of bringing the elevator car to a stop.

If the elevator car is travelling in a down direction and is to stop at a floor, the inductor relays E, AE and F successively reach the inductor plates DE, ADE and DF for the purpose of decreasing the speed of the elevator car and stopping the elevator car at a desired floor.

The auxiliary inductor relay AE has contact members AE1 and AE2 which are associated with an auxiliary speed relay AV. Additional contact members U8 and D8 are provided on the up switch U and the down switch D for further controlling the energization of the auxiliary speed relay AV. It will be observed that the contact members U8, AE1, D8 and AE2 are associated with the auxiliary speed relay AV in the same manner by which the contact members U4, E1, D4 and E2 are associated with speed relay V. The coil of the relay AE is connected in series with the coil of the inductor relay E for simultaneous energization therewith.

The auxiliary speed relay AV has a pair of contacts AV2 for establishing a shunt or by-pass around a resistor AVr. The resistor AVr is interposed between the resistor Ar and the conductor L2 for the purpose of further controlling the energization of the bridge circuit comprising the resistors r1, r2, r'3, r4, and the field windings Rd and Gf.

Figure 5:
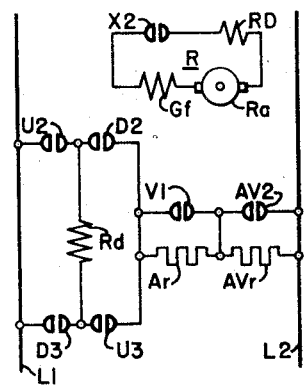
Fig. 5 is a schematic view of an elevator system with parts broken away showing a further modification of the system illustrated in Fig. 1.

The system of Fig. 1 differs further from the system illustrated in Fig. 5 of the aforesaid Santini et al. patent by providing capacitors C1, C2 and C3 which may be connected in shunt across the resistor r6. The connections of the capacitors are controlled in part by contact members U6, U7, D6 and D7 provided on the up switch U and the down switch D. When the elevator car is set for travel in an up direction, the contact members U6 and U7 are closed to connect the capacitor C1 across the resistor r6. In addition, contact members V3 on the speed relay V and contact members AV1 provided on the auxiliary speed relay AV are closed to connect all three capacitors C1, C2 and C3 in parallel across the resistor r6. When the elevator car reaches the first slowdown point, the speed relay V is deenergized to open its contacts V3. Such opening removes the capacitor C3 from service. This decreases the damping introduced by the capacitors. (If this initial decrease in damping is not desired, the contacts V3 may be permanently shunted.) When the elevator reaches its second slowdown point, the auxiliary speed relay AV is deenergized to open its contact members AV1. This removes the capacitor C2 from service and still further decreases the damping of the system.

The operation of the entire system now may be set forth. Let it be assumed initially that the elevator car 10 is at rest and that it is desired to move the car in an up direction. The elevator attendant operates the master switch in a counterclockwise direction, as viewed in Fig. 1, to establish an energizing circuit for the up switch U and the auxiliary switch X. If the interlocking contacts, such as the gate contacts and the door contacts are all closed, these switches will be energized to prepare the elevator system for up travel.

Upon energization the up switch closes its contacts members U1 to energize the brake releasing winding Bw. Such energization releases the brake B. Also the contact members U2 and U3 are closed to connect the bridge circuit for energization with proper polarity to assure travel of the elevator car in an up direction. The contact members U4 close to energize the speed relay V through the closed contact members E1 of the inductor relay E. The speed relay closes its contact members V1 to by-pass the resistor Ar and opens its contact members V2 to prevent energization of the coil of the landing inductor relay F.

When energized, the up switch U also closes its contact members U8 to energize the auxiliary speed relay AV through the closed contact members AE1. The auxiliary speed relay thereupon closes its contact members AV2 to by-pass the resistor AVr. Consequently, the bridge circuit is connected directly across the conductors L1 and L2 to produce full speed operation of the elevator car.

The up direction switch U also closes the front contact members U5 to establish a by-pass around the master switch MS.

The auxiliary relay X closes its contact members X1 to prepare the coils of the inductor relays for subsequent energization.

At the same time, the up switch U closes its contact members U6 and U7 to connect the capacitor C1 across the resistor R6. Furthermore, the energization of the speed relays V and AV results in closure of the contact members V3 and AV1 to connect the capacitors C2 and C3 in parallel across the resistor r6.

The elevator system now is conditioned for up travel and a car accelerates to its full speed. The operation of the system under these conditions is very similar to the operation of the system illustrated in Fig. 5 of the aforesaid Santini et al. patent except that the capacitors C1, C2 and C3 connected across the resistor r6 provides substantial damping for the elevator system.

When the elevator car is to be stopped at a desired floor, the master switch MS is returned to the position illustrated in Fig. 1. This has no immediate effect on the movement of the elevator car for the reason that the contact members U5 of the up switch maintain the energization of the switches U and X.

The centering of the master switch establishes an energizing circuit for the coils E and AE. However, these coils cannot actuate their associated contact members E1, E2, AE1 and AE2 until the inductor relays are adjacent their associated inductor plates.

When the inductor relay E reaches the plate UE for the desired floor, the contact members E1 and E2 are opened to deenergize the speed relay V. The speed relay V opens its contact members V1 to introduce the resistor Ar between the bridge circuit and the conductor L2. Since the introduction of the resistor decreases the energization of the main field winding Gf, the speed of the elevator car is reduced. In addition, the back contact members V2 of the speed relay close to energize the coil of the landing inductor relay F. The contact members V3 open to remove the capacitor C3 from service. Since the capacitor reactance connected across the resistor r6 is decreased, the damping of the elevator motor also is decreased.

As previously pointed out, if the decrease in damping at this time is not required, the contact members V3 may be permanently shunted. Alternatively, the capacitor C3 may be omitted, and the capacitor C1 may be made sufficient in size to provide the desired continuous damping.

As the elevator car continues in an upward direction at reduced speed, the auxiliary inductor relay AE reaches the associated inductor plate AU3 and opens its contact members AE1 and AE2. Such opening of the contact members deenergizes the auxiliary speed relay AV.

The auxiliary speed relay AV opens its front contact members AV2 to introduce the resistor AVr between the resistor Ar and the conductor L2. Since this decreases the current through the main field winding Gf still further, the elevator car is decelerated towards a slow landing speed. In addition, the contact members AV1 open to remove the capacitor C2 from service. Such removal still further decreases the damping of the elevator motor.

When the landing inductor plate F reaches the associated inductor plate UF, the contact members F1 and F2 open to deenergize the up switch U and the auxiliary relay X. The contact members U1 open to apply the brake B for the purpose of bringing the elevator car to a stop. The contact members U2 and U3 open to disconnect the bridge circuit from the associated conductors L1 and L2. Since the motor is now deenergized and the brake is applied, the elevator car stops at the desired floor. The contact members U4 to U8, and the contact members X1, all open to restore the system to the condition illustrated in Fig. 1.

If the elevator car is to be moved in a down direction, the master switch MS is rotated in a clockwise direction, as viewed in Fig. 1, to energize the down switch D and the auxiliary switch X. If the interlocking gate and door contacts are closed, these switches are energized to prepare the elevator car for down operation. The contacts X1 close to prepare the inductor relay windings for subsequent energization.

The contact members D1 close to energize the brake winding BW and release the brake B. Also the contact members D2 and D3 close to connect the bridge circuit for energization from the conductors L1 and L2 with proper polarity to assure down travel of the elevator car. The contact members D4 and D8 close to energize the associated relays V and AV. These relays close contact members V1 and AV2 for the purpose of by-passing the resistors Ar and AVr. The contact members D5 close to establish a by-pass around the master switch MS.

The capacitors C1, C2 and C3 again are connected in parallel across the resistor r6 by reason of the closure of the contact members D6, D7, V3 and AV1. Consequently, the elevator car proceeds in a down direction and the system is highly damped by the three capacitors.

If it is desired to stop the car during its down travel at a desired floor, the master switch is returned to the position illustrated in Fig. 1. The master switch now establishes a circuit for energizing the coils E and AE of the slowdown inductor relays.

When the inductor relay E reaches the inductor plate DE for the desired floor, the contact members E1 and E2 open to deenergize the speed relay V. Such deenergization inserts the resistor Ar between the bridge circuit and the conductor L2 for the purpose of reducing the speed of the elevator car. In addition the contact members V3 open to remove the capacitor C3 from service. (As previously pointed out, the reduction in capacitance by operation of the contact members V3 may be omitted if so desired.) The elevator car now proceeds at reduced speed and with reduced damping. When the inductor relay AE reaches the inductor plate ADE for the desired floor, the resultant openings of the contact members AE1 and AE2 deenergize the auxiliary speed relay AV. This deenergization results in the opening of the contact members AV2 to insert the resistor AVr between the resistor Ar and the conductor L2. The consequent reduction in current supplied to the main field winding Gf results in a further decrease in the speed of the car to a desired landing speed. At the same time, the opening of the contact members AV1 removes the capacitor C2 from service and decreases still further the damping of the elevator motor.

The landing inductor relay F next reaches its inductor plate DF and opens its contacts F1 and F2 to deenergize the switches D and X.

The contact members D1 open to deenergize the brake winding and reapply the brake. The contact members D2 and D3 open to disconnect the bridge circuit from the associated conductors L1 and L2. Since the motor now is deenergized and the brake is applied, the elevator stops at the desired floor. The contact members D4 to D8 and the contact members X1 open to restore the system to the condition illustrated in Fig. 1.

If damping were not desired during the final slow down of the elevator car, the capacitor C1 could be omitted. If increased damping during slow down were desired, the contact members could be arranged to add capacitors across the resistor $r6$ during the slowdown period. For example, the contact members AV1 and V3 could be replaced by back contact members on the relays AV and V for the purpose of adding the capacitors C2 and C3 across the resistor $r6$ when the relays are deenergized during the deceleration period. Such addition of a capacitor across the resistor $r6$ during the deceleration period will be discussed below with reference to Fig. 4.

The capacitors cooperate with the resistor $r6$ to provide a circuit having a time constant which controls the energization of the shunt field winding $Rf$. The control exercised by the time-constant circuit may be understood more clearly from a consideration of Figs. 2 and 3.

Figure 2:
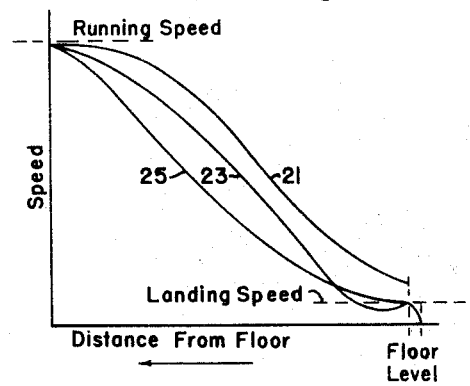
Figs. 2 and 3 are graphical representations on Cartesian co-ordinates wherein abscissae represent distance of an elevator from the floor at which the elevator car is to stop, and ordinates represent the speed of the elevator car.

Referring to Fig. 2, it should be noted that ordinates represent the speed of the elevator car, whereas abscissae represent the distance of the elevator car from a floor level at which the elevator car is to stop. It will be understood that the elevator car speed is reduced from a predetermined running speed to a predetermined landing speed as it approaches the desired floor. The application of the elevator brake brings the car to a stop from the landing speed accurately at the desired floor.

Let it be assumed that the deceleration of the car from its running speed towards its landing speed is represented by a curve 21. It will be noted that an elevator car operating in accordance with the curve 21 does not reach a sufficiently low landing speed adjacent the desired floor. The elevator car may be slowed more rapidly by increasing the strength of the field winding $Rf$. The effect of such an increase is represented by the curve 23. It will be noted that the elevator car now overshoots the desired landing speed and finally returns to the desired landing speed by the time the landing inductor relay operates to apply the elevator brake. The overshoot indicates an inefficient and undesirable operation of the elevator system.

Let it be assumed that when the elevator car is to be decelerated a capacitor is connected across the resistor $r6$ of Fig. 1. By proper selection of the capacitor, which for a conventional system may be an electrolytic capacitor having a capacitance of several hundred microfarads, the elevator car is caused to slow down or decelerate in accordance with the curve 25. An inspection of curve 25 indicates that the elevator car now decelerates in an efficient manner to the desired landing speed.

The performance of the elevator system wherein a capacitor is connected across the resistor $r6$ of Fig. 1 at the beginning of the period of deceleration may be explained as follows: At the beginning of the period of deceleration the field winding $Rf$ receives current not only through the resistor $r6$, but also receives the charging current of the capacitor connected across the resistor. The charging current increases the field excitation provided by the field winding $Rf$ and produces rapid deceleration during the first part of the decelerating period. As the capacitor charges, the charging current decreases and the elevator speed reaches the desired landing speed without any undesirable overshoot.

The time-constant circuit represented by the resistor $r6$ and the capacitor connected thereacross introduces substantial damping for the elevator motor M. It can be shown that the degree of damping is a function of the derivative relative to time of the rate of rotation of the motor. Such damping tends to prevent the previously mentioned overshoot represented by the curve 23.

As previously pointed out, a capacitor may be connected across the resistor $r6$ during the entire operation of the elevator system for the purpose of providing damping throughout the operating period. Alternatively the capacitor may be connected across the resistor during any desired portion of the operating period such as that required for deceleration. The magnitude of the capacitor connected across the resistor may be adjusted as desired. As previously pointed out, capacitors may be removed during the deceleration period for the purpose of decreasing the damping of the system.

Figure 3:
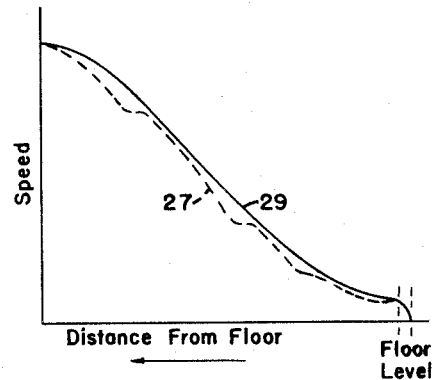

If few slowdown steps are employed for the elevator system, the deceleration of an elevator car as it approaches a floor at which it is to stop may be that represented by the dotted curve 27 in Fig. 3. The curve would be substantially more smooth if the field strength of the field winding $Rf$ were reduced. However, a strong field excitation from this winding is desired for the purpose of obtaining good steady-state speed regulation at running and landing speeds. By adopting a time constant circuit such as that represented by connecting a capacitor across the resistor $r6$ of Fig. 1, the performance of the elevator system is improved to provide a deceleration of the elevator car as represented by the full line curve 29 of Fig. 3. This improvement in the performance of the system is effected without undesirably decreasing the field strength of the field winding $Rf$.

Figure 4:
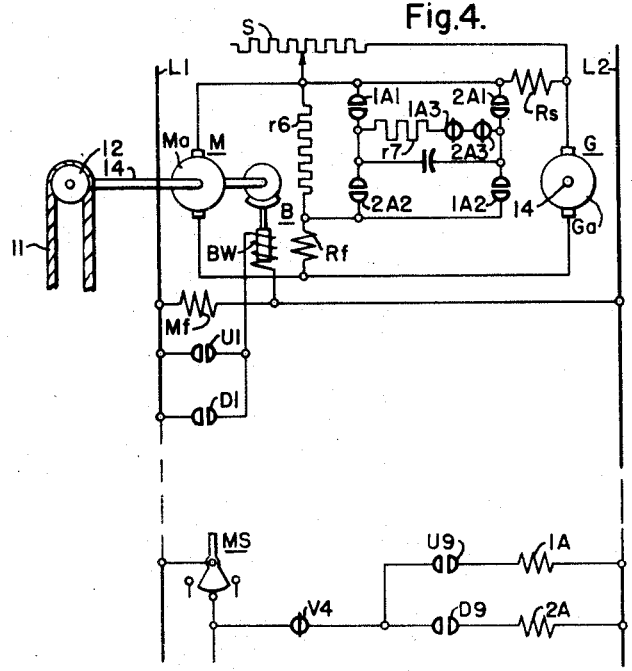
Fig. 4 is a schematic view of an elevator system with parts broken away showing a modification of the system illustrated in Fig. 1.

As previously pointed out, a capacitor may be connected in parallel with the resistor $r6$ at the beginning of a decelerating period for the elevator car. An elevator system wherein a capacitor is so connected is illustrated in Fig. 4. The system of Fig. 4 may be exactly similar to that illustrated in Fig. 1 except for the connection of the capacitor across the resistor $r6$. Consequently, only enough of the system of Fig. 1 is illustrated in Fig. 4 to show the changes in the system.

By reference to Fig. 4, it will be observed that a capacitor C4 is provided for connection across the resistor $r6$. This capacitor is connected across a resistor through contacts 1A1 and 1A2 of an auxiliary relay 1A or through contacts 2A1 and 2A2 of an auxiliary relay 2A.

The master switch MS not only performs the functions illustrated in Fig. 1, but it also controls in part the energization of the auxiliary relays 1A and 2A. To this end the stop contact of the master switch also is connected through back contact members V4 on the speed relay V to the coils of the relays 1A and 2A. The connection to the coil 1A is effected through front contact members U9 provided on the up switch U of Fig. 1. The circuit for the coil of the relay 2A is completed through front contact members D9 of the down switch D of Fig. 1.

The operation of the embodiment illustrated in Fig. 4 may be set forth briefly. If the elevator car is travelling in an up direction, the up switch U is energized and the contact members U9 are closed. The speed relay V is also energized and the contact members V4 are open.

If the elevator car is to stop at a desired floor, the master switch MS is returned to the position illustrated in Fig. 4. In this position the coil of the relay 1A cannot be energized for the reason that the contact members V4 are open. When the inductor relay E of the elevator car reaches the associated inductor plate UE (Fig. 1) for the desired floor, the inductor relay contacts open to deenergize the speed relay V. This results in initiation of a deceleration operation for the elevator car. At the same time, the back contact members V4 (Fig. 4) of the speed relay close to complete an energizing circuit for the coil of the relay 1A. This circuit may be traced from the conductor L1 through the master switch MS, the stop contact of the master switch, the contact members V4 and U9, and the coil of the relay 1A to the conductor L2. In response to the energization of the coil of the relay 1A, the contact members 1A1 and 1A2 close to connect the capacitor C4 across the resistor r6. The capacitor thereupon cooperates with the resistor to provide deceleration similar to that represented by the curve 25 of Fig. 2.

If the elevator car were operating in a down direction, the contact members U9 would be open and the contact members D9 would be closed. If the elevator car were to be brought to a stop at a desired floor, the master switch MS would be centered as illustrated in Fig. 4. When the elevator car reaches a position wherein the inductor relay E is substantially adjacent the associated inductor plate DE for the desired floor, a decelerating operation of the car would be initiated. At the same time, the back contact members V4 of the speed relay would close to energize the coil of the relay 2A through a circuit which may be traced from the conductor L1 through the master switch, the stop contact of the master switch, the back contact members V4, the front contact members D9 and the coil of the relay 2A to the conductor L2. Upon energization of the coil, the contact members 2A1 and 2A2 close to connect the capacitor across the resistor r6. The capacitor and the resistor again cooperate to produce the desired deceleration of the elevator car represented in Fig. 2 by the curve 25.

The various capacitors may have sufficient leakage resistance to assure discharge of the capacitors after the elevator car has come to rest and before the elevator car is again started. If a capacitor does not have sufficient leakage resistance for this purpose, an auxiliary resistor having high value of resistance may be connected thereacross. Such a resistor r7 is illustrated in Fig. 4. If back contact members 1A3 and 2A3 of the relays 1A and 2A are connected in series with the resistor r7, a small discharge resistance may be employed without affecting the performance of the capacitor. When one of the relays 1A or 2A operates to connect the capacitor C4 across the resistor r6, contact members 1A3 or 2A3 open to interrupt the connection of the resistor r7 across the capacitor.

For effective derivative damping, the resistance of the field winding $R_f$ should be small compared to the resistance of the resistor r6. Ratios of the resistance of the field winding to that of the resistor r6 of the order of 1:6 or less readily may be obtained in practice. As previously pointed out, in a system of the type illustrated in the aforesaid Santini et al. patent, the capacitor C4 may have a capacitance in the range of one hundred microfarads to 1000 microfarads. In one application, a capacitor C4 having a capacitance of 1000 microfarads was found suitable.

The invention may be employed with systems wherein the bridge type regulator of Figs. 1 and 4 is replaced by other regulator circuits. An example of other connections suitable for the regulator is found in the White et al. Patent 1,884,446.

Fig. 5 represents an elevator system which may be exactly the same as the system of Fig. 1 or the system of Fig. 4, except for the replacement of the circuits within the dotted rectangle 35 of Fig. 1 by the circuits specifically illustrated in Fig. 5. It will be observed that in Fig. 5 the regulator armature $R_a$ is connected in series with the generator field winding $G_f$ and an additional field winding RD provided on the regulator through front contact members X2 which are provided on the relay X illustrated in Fig. 1. When the relay X is energized, the front contact member X2 of Fig. 5 are closed to connect the field windings $G_f$ and RD across the regulator armature $R_a$ for energization therefrom.

The regulator field winding $R_d$ is connected for energization through the front contact members U2 and U3 when the elevator car is conditioned for travel in an up direction and through the contact members D2 and D3 when the elevator car is conditioned for travel in a down direction. The field windings $R_s$ and $R_f$ of the regulator generator for the system of Fig. 5 may be connected for energization in the manner discussed with reference to Figs. 1 or 4.

It will be recalled that when the elevator car is conditioned for travel in an up direction, the up switch U is energized and closes its contact members U2 and U3. This connects the field winding $R_d$ of Fig. 5 for energization through a circuit which may be traced from the conductor L1, through the contact members U2, the field winding $R_d$, the contact members U3 and the resistors $A_r$ and $AV_r$ to the conductor L2. Since the contact members X2 of the relay X also are closed, the energization of the field winding $R_d$ causes a current to flow through the field windings $G_f$ and RD. The polarity of the energization of the field winding $R_d$ through the contact members U2 and U3 is selected to energize the main generator field winding $G_f$ in the proper direction to produce up travel of the elevator car. The self-energized winding RD of the regulator increases the rate at which current for the main generator field winding is built up.

The contact members V1 and AV2 operate in the same manner discussed with reference to Fig. 1 to shunt the resistors $A_r$ and $AV_r$ to increase the energization of the field winding $R_d$ and the speed of travel of the elevator car. The maximum running speed of the elevator is obtained when both of these pairs of contact members are closed.

As the elevator car approaches a floor at which it is to stop, the contact members V1 open to decrease the energization of the field winding $R_d$. The resultant decrease in the current output of the regulator results in a decrease in the speed of the elevator car.

Subsequently, the contact members AV2 open to decrease still further the energization of the field winding Rd for the purpose of bringing the elevator car to its landing speed. When the elevator car is at the proper distance from the floor, the contact members U2 and U3 open to deenergize the field winding Rd and the contact members X2 open to interrupt the circuit for the main generator field winding Gf. At the same time, the application of the brake brings the elevator car to a stop accurately at the desired floor.

For downward travel of the elevator car, the contact members D2 and D3 of Fig. 5 are closed instead of the contact members U2 and U3. The resulting connection of the field winding Rd is in the proper direction for downward travel of the elevator car. Since the system of Fig. 5 operates in the same manner as the system of Fig. 1 or the system of Fig. 4 except for the connections of the regulator, it is believed that a further discussion of the system illustrated in Fig. 5 is unnecessary.

Although the invention has been described with reference to certain specific embodiments thereof, numerous modifications falling within the spirit and scope of the invention are possible.

I claim as my invention:

1. In a direct-current-controlled motor system, a motor, a main generator for supplying electrical energy to the motor, a regulator generator, connections for supplying field energization to the main generator from the regulator generator, said regulator generator having a field winding, and a circuit having a time constant associated with the field winding of the regulator generator for controlling the rate of change of energization of the field winding of the regulator generator.

2. A system as defined in claim 1 wherein the circuit comprises a resistor connected in series with the field winding of the regulator generator, and a capacitor unit connected to shunt the resistor.

3. A system as defined in claim 1 wherein the circuit is adjustable for varying the time constant.

4. A system as defined in claim 2 in combination with means for adjusting the time constant of the circuit comprising the resistor and the capacitor unit.

5. A system as defined in claim 2 wherein the capacitor unit comprises a plurality of capacitors in combination with selective means operable for connecting different combinations of the capacitors in shunt with the resistor.

6. In a variable voltage control system, a main generator having a field winding, a motor connected with the main generator in a loop circuit, a regulator generator connected for energizing the field winding, a resistor, said regulator generator having a field winding connected through the resistor for energization substantially in accordance with the motor voltage, and a capacitor connected in shunt with the resistor for controlling the rate of change in energization of the last-named field winding.

7. In a variable voltage control system, a main generator having an armature and a first field winding, a motor having an armature, a regulator having second, third and fourth field windings, a loop circuit connecting in series the main generator armature, the motor armature and the second field winding, a bridge circuit having the first field winding and the third field winding in series in one arm thereof, a resistor, a circuit connecting the resistor and the fourth field winding in series for energization substantially in accordance with the voltage of the motor, and means associated with the resistor establishing a time constant for controlling the rate of change of current in the fourth field winding.

8. A system as defined in claim 7 wherein the last-named means comprises a capacitor unit connected in shunt with the resistor.

9. A system as defined in claim 8 wherein the capacitor unit is adjustable for varying the capacitance across the resistor.

10. In a direct-current control system, a motor, a main generator for supplying electrical energy to the motor, a regulator generator for controlling the field energization of the main generator, said regulator generator having a field winding, a circuit connecting the field winding for energization in accordance with a function of the main generator output, means for adjusting the energization of the regulator generator for adjusting the speed of the motor, and means responsive to the adjustment of the energization of the regulator generator for varying the time constant of the circuit.

11. A system as defined in claim 10 wherein the circuit includes a resistor connected in series with the field winding, and the last-named means comprises a capacitor unit, and means responsive to the energization of the regulator for controlling the connection of the capacitor unit in shunt with the resistor.

12. A system as defined in claim 11 wherein the capacitor unit is adjustable to provide different capacitances, and the last-named means varies the magnitude of the capacitance of the capacitor unit connected in shunt across the resistor as a function of the energization of the regulator generator.

13. In a variable voltage control system, a main generator having an armature and a first field winding, a motor having an armature, a regulator generator having second, third and fourth field windings, a loop circuit connecting in series the main generator armature, the motor armature and the second field winding, a bridge circuit having the first field winding and the third field winding in series in one arm thereof, a resistor, a circuit connecting the resistor and the fourth field winding in series for energization substantially in accordance with the voltage of the motor, a capacitor unit, and means responsive to initiation of a change in the energization of the motor for controlling the connection of the capacitor unit in shunt with the resistor.

14. A system as defined in claim 13 wherein the capacitor unit comprises a plurality of capacitors, and the last-named means in response to successive initiations of changes in the energization of the motor successively connects the capacitors across the resistor.

15. In an elevator system, an elevator car, driving means including a motor having an armature for driving the elevator car, a main generator for supplying electrical energy to the motor, said generator having a first field winding and an armature, a regulator generator having an armature and second, third and fourth field windings, a loop circuit connecting the main generator armature, the motor armature and the second field winding in series, a bridge circuit having the first and third field windings in series in one arm thereof, the armature of the regulator generator being connected across a first diagonal of the bridge circuit, an adjustable source of electric energy connected across a second diagonal of the bridge circuit, a resistor, a circuit connecting in series the resistor and the fourth field winding for energization in accordance with a function of the motor voltage, a capacitor unit, and means responsive to arrival of the elevator car at a predetermined distance from a floor at which a stop is to be made for decreasing the energization of the bridge circuit by said source and for connecting the capacitor unit across the resistor, whereby the elevator car is decelerated towards a landing speed.

16. A system as defined in claim 15 wherein the capacitor unit comprises a plurality of capacitors, and the last-named means is responsive to successive arrivals of the elevator car at successive distances from the floor at which a stop is to be made for successively connecting the capacitors in shunt with the resistor.

17. In an elevator system, an elevator car, driving means including a motor having an armature for driving the elevator car, a main generator for supplying electrical energy to the motor, said generator having a first field winding and an armature, a regulator generator having an armature and second, third and fourth field windings, a loop circuit connecting the main generator armature, the motor armature and the second field winding in series, a bridge circuit having the first and third field windings in series in one arm thereof, the armature of the regulator generator being connected across a first diagonal of the bridge circuit, an adjustable source of electric energy connected across a second diagonal of the bridge circuit, a resistor, a circuit connecting in series the resistor and the fourth field winding for energization in accordance with a function of the motor voltage, and a capacitor connected in shunt across the resistor.

18. In a variable voltage control system, a main generator having an armature and a first field winding, a motor having an armature, a regulator having an armature and second, third, fourth and fifth field windings, a loop circuit connecting in series the main generator armature, the motor armature and the second field winding, connections for energizing the first and third field windings in accordance with the current output of the regulator armature, a resistor, a circuit connecting the resistor and the fourth field winding for energization substantially in accordance with the voltage of the motor, and means associated with the resistor establishing a time constant for controlling the rate of change of current in the fourth field winding.

19. A system as defined in claim 18 wherein the means comprises a capacitor unit connected in shunt with the resistor.

20. A system as defined in claim 19 in combination with means for controlling the energization of the fifth field winding, and means responsive to the energization of the fifth field winding for controlling the connection of the capacitor unit in shunt with the resistor.

21. In an elevator system, an elevator car, driving means including a main generator having an armature and a first field winding, a motor having an armature for driving the elevator car, a regulator having an armature and second, third, fourth and fifth field windings, a loop circuit connecting in series the main generator armature, the motor armature and the second field winding, connections for energizing the first and third field windings in accordance with the current output of the regulator armature, a resistor, a circuit connecting the resistor and the fourth field winding for energization substantially in accordance with the voltage of the motor, and a capacitor unit connected across the resistor.

22. A system as defined in claim 21 in combination with means controlling the energization of the fifth field winding, and means responsive to arrival of the car at a predetermined distance from a floor at which a stop is to be made for modifying the energization of the fifth field winding and for modifying the connection of the capacitor unit across the resistor.

WALTER H. ESSELMAN.

No references cited.